United States Patent
Westervelt et al.

(10) Patent No.: US 12,516,637 B1
(45) Date of Patent: Jan. 6, 2026

(54) SENSING OF ISOLATOR SHOCK SYSTEMS

(71) Applicant: General Electric Company, Evendale, OH (US)

(72) Inventors: Eric Richard Westervelt, Niskayuna, NY (US); Nicholas William Candelino, Malta, NY (US); Glen Peter Koste, Niskayuna, NY (US); James R. Reepmeyer, Montgomery, OH (US); Jack Michael Donnellan, Huntington Station, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/063,927

(22) Filed: Feb. 26, 2025

(51) Int. Cl.
| | |
|---|---|
| *F02C 9/28* | (2006.01) |
| *F02C 7/04* | (2006.01) |
| *F02C 9/26* | (2006.01) |
| *F02C 9/52* | (2006.01) |
| *F02K 7/10* | (2006.01) |

(Continued)

(52) U.S. Cl.
CPC .................. *F02C 9/28* (2013.01); *F02C 7/04* (2013.01); *F02C 9/26* (2013.01); *F02C 9/52* (2013.01); *F02K 7/10* (2013.01); *F02K 7/14* (2013.01); *F02K 9/96* (2013.01)

(58) Field of Classification Search
CPC ...... F02C 9/26; F02C 9/28; F02C 9/52; F02C 7/04; F02K 7/10; F02K 7/14; F02K 9/96; G01M 15/14; F05D 2270/331
See application file for complete search history.

(56) References Cited

U.S. PATENT DOCUMENTS

| | | | |
|---|---|---|---|
| 5,909,273 | A | 6/1999 | Malvern |
| 6,417,507 | B1 | 7/2002 | Malvern |
| 6,550,342 | B2 | 4/2003 | Croteau |

(Continued)

FOREIGN PATENT DOCUMENTS

| | | |
|---|---|---|
| FR | 3127024 | 3/2023 |
| FR | 3127025 | 3/2023 |

(Continued)

OTHER PUBLICATIONS https://www.hbkworld.com/en/knowledge/resource-center/articles/strain-measurement-basics/optical-strain-sensor-fundamentals/what-is-a-fiber-bragg-grating#!ref_hbm.com; Webcapture dated Feb. 6, 2024 (4 pgs.).

*Primary Examiner* — William H Rodriguez
(74) *Attorney, Agent, or Firm* — Smith Gambrell & Russell LLP

(57) ABSTRACT

In some embodiments, apparatuses and methods are provided herein useful for an engine. In some embodiments, the engine includes an isolator duct extending axially from an inlet side and a burner side; a plurality of strain sensors distributed axially along a radially outward surface of the isolator duct and configured to sense strain on the radially outward surface of the isolator duct; and a processor coupled to the plurality of strain sensors. In some embodiments, the processor configured to: obtain sensor values from one or more of the plurality of strain sensors; determine a measured strain distribution based on the sensor values and axial locations of the plurality of strain sensors; and estimate a shock train leading edge position based on identifying a shock train leading edge in the measured strain distribution, where the engine system includes an air-breathing propulsion engine.

20 Claims, 9 Drawing Sheets

(51) Int. Cl.
  *F02K 7/14*      (2006.01)
  *F02K 9/96*      (2006.01)

(56) References Cited

U.S. PATENT DOCUMENTS

| | | | | |
|---|---|---|---|---|
| 7,797,943 | B2* | 9/2010 | Bulman | .............. F02K 7/10 |
| | | | | 60/768 |
| 11,002,223 | B2 | 5/2021 | Cicchini | |
| 11,261,785 | B2 | 3/2022 | Cicchini | |
| 11,384,712 | B1 | 7/2022 | Bakos | |
| 11,619,193 | B1 | 4/2023 | Mercier | |
| 2024/0043112 | A1* | 2/2024 | Borazjani | .............. B64C 21/01 |

FOREIGN PATENT DOCUMENTS

| | | |
|---|---|---|
| FR | 3127269 | 3/2023 |
| FR | 3129375 | 5/2023 |
| FR | 3129428 | 5/2023 |
| FR | 3129432 | 5/2023 |
| FR | 3129436 | 5/2023 |
| FR | 3129690 | 6/2023 |
| FR | 3129970 | 6/2023 |
| FR | 3129972 | 6/2023 |
| FR | 3130313 | 6/2023 |
| FR | 3130323 | 6/2023 |
| FR | 3130747 | 6/2023 |
| FR | 3130874 | 6/2023 |
| FR | 3130875 | 6/2023 |
| FR | 3130877 | 6/2023 |
| FR | 3130879 | 6/2023 |
| FR | 3130894 | 6/2023 |
| FR | 3130895 | 6/2023 |
| FR | 3130896 | 6/2023 |
| FR | 3130897 | 6/2023 |
| FR | 3132279 | 8/2023 |
| FR | 3132729 | 8/2023 |
| FR | 3132743 | 8/2023 |
| FR | 3133367 | 9/2023 |
| FR | 3133368 | 9/2023 |

* cited by examiner

SENSING OF ISOLATOR SHOCK SYSTEMS

TECHNICAL FIELD

This invention relates generally to an isolator duct of an engine.

BACKGROUND

A dual-mode ramjet is a form of airbreathing jet engine that requires forward motion of the engine to provide air for combustion. The inlet isolator section of a ramjet engine is a constant area or slightly diverging section that provides for pre-combustion pressure rise from the inlet conditions to the backpressure imposed by heat release in the combustor. This diffusion process of the pre-combustion pressure rise is accomplished through a series of normal or oblique shock waves called a shock train, which grows in length as the backpressure increases or the inlet airflow momentum decreases. The inlet immediately unstarts when the shock train length exceeds the length of the isolator. Unstart events are severe at hypersonic conditions and at a minimum required time for a restart procedure. In the worst case, the severe unstart loads will cause loss of vehicle control.

BRIEF DESCRIPTION OF DRAWINGS

Disclosed herein are embodiments of systems, apparatuses and methods pertaining to an isolator strain sensing system of an engine. This description includes drawings, wherein.

Figure 1:
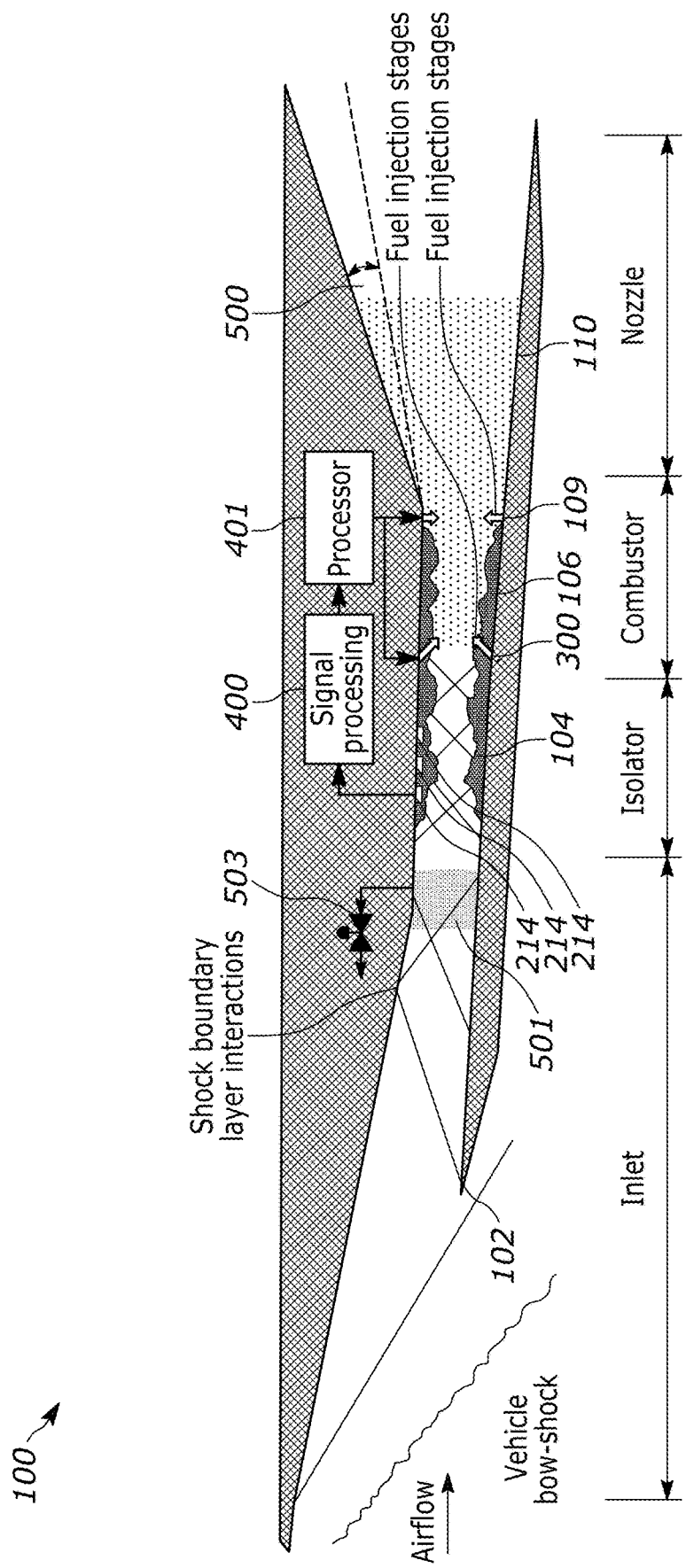
FIG. 1 is an illustrative engine system in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments," "an implementation," "some implementations," "some applications," or similar language means that a particular feature, structure, or characteristic described in connection with the embodiment is included in at least one embodiment of the invention. Thus, appearances of the phrases "in one embodiment," "in an embodiment," "in some embodiments," "in some implementations," and similar language throughout this specification may, but do not necessarily, all refer to the same embodiment.

Generally speaking, pursuant to various embodiments, systems, apparatuses, and methods are provided herein useful to an engine. In some embodiments, an engine system includes an isolator duct extending axially from an inlet side and a burner side. Alternatively or in addition, the engine system includes a plurality of strain sensors distributed axially along a radially outward surface of the isolator duct and configured to sense strain on the radially outward surface of the isolator duct. Alternatively or in addition, the engine system includes a processor coupled to the plurality of strain sensors. In some embodiments, the processor obtains sensor values from one or more of the plurality of strain sensors. In some embodiments, the processor determines a measured strain distribution based on the sensor values and axial locations of the plurality of strain sensors. In some embodiments, the processor estimates a shock train leading edge position of a shock train based on identifying a shock train leading edge in the measured strain distribution. In some embodiments, the engine system includes an air-breathing propulsion engine.

In some embodiments, a method for an engine includes obtaining, by a processor, sensor values from one or more of a plurality of strain sensors distributed axially along a radially outward surface of an isolator duct that extends axially from an inlet side and a burner side. In some embodiments, the sensor values are strain data sensed by the plurality of strain sensors on the radially outward surface of the isolator duct. Alternatively or in addition, the method may include determining, by the processor, a measured strain distribution based on the sensor values and axial locations of the plurality of strain sensors. Alternatively or in addition, the method may include estimating, by the processor, a shock train leading edge position of a shock train based on identifying a shock train leading edge in the measured strain distribution. In some embodiments, the engine includes an air-breathing propulsion engine.

An isolator duct of an aircraft engine (e.g., an air-breathing propulsion engine such as a ramjet and a scramjet) typically provides pressure rise from an inlet to a combustor of the aircraft engine. In some aspects, a plurality of strain sensors are distributed axially along a radially outward surface of the isolator duct to sense strain on the radially outward surface of the isolator duct. As heat is released, a shock train (e.g., a series of shock waves) develops and grows toward the front (inlet side) of the isolator duct. The strain sensors sense the shock train as the shock train travels to the front of the isolator duct. In some embodiments, as shock train travels toward the front of the isolator duct, the outward pressure exerted by the shock train to the wall of the isolator duct causes strain on the outward surface of the isolator duct that the strain sensors can readily sense.

In some aspects, a measured strain distribution is determined by a processor based on the sensor values and the corresponding axial locations of the strain sensors the sensor values were obtained from. In still other aspects, a shock train leading edge of the measured strain distribution is determined by the processor. For example, the shock train leading edge may be the first instance that a strain sensor located on a particular axial location on the outward surface of the isolator duct senses a strain on the outward surface of the isolator duct caused by the pressure exerted onto the inner wall of the isolator duct by the shock train. The processor may then estimate a shock train leading edge position of the shock train as the shock train travels in real time to the front of the isolator duct.

In some embodiments, the processor controls a fuel injector to modulate fuel flow to the aircraft engine and control back pressure produced by the aircraft engine system to prevent the shock train from extending beyond the inlet causing a violent breakdown of the airflow and the airflow to be diverted around the inlet causing the engine to unstart or an engine unstart to exist. An unstart or unstart condition can cause a loss of thrust, loss of aircraft control, and significant mechanical loading. The unstart or unstart condition can also lead to large acoustic and thermal load, which can be dangerous for the aircraft. Conventionally, a direct way of measuring the location of the shock train is by installation of multitude of pressure sensors along an isolator duct. However, the number of sensing locations can be limited due to the pressure sensors' size. On the contrary, determining/measuring the location of the shock train as disclosed herein via distributed strain sensing on the isolator duct provides an accurate spatial and temporal resolution of the shock train location and morphology during engine operation. Moreover, by providing the measurement of the location to a real-time or near-real time estimation and control algorithms as described herein, the operating conditions during engine operation can be manipulated to control position and geometry of the shock train, which can be used to enable unstart prediction and prevention as well as smaller, lower-weight engine and vehicle designs.

Referring now to the drawings, FIG. 1 is an illustrative engine system 100 in accordance with some embodiments. In some aspects, the engine system 100 includes an air-breathing propulsion engine (also known as ducted jet engine). An air-breathing propulsion engine is an aircraft engine that uses atmospheric air to generate exhaust gases or to combust fuel, such as a turbojet, a turboprop, a ramjet, a scramjet, and/or a pulsejet. The engine system 100 includes an inlet 102, an isolator duct 104, a combustor/burner 106, fuel injectors (e.g., a secondary injector 109, a primary injector 300), one or more bleed valves 503, and a nozzle 110. The inlet 102 is an opening to an isolator duct configured to improve airflow in the combustor/burner 106 and to extend the operating range of the engine system 100. The isolator duct may be a constant or slightly-diverging area duct that connects the inlet 102 and combustor/burner 106. In some embodiments, the isolator duct may be formed of 304 Stainless Steel (SS), 17-4 PH, Inconel 625, and Inconel 718 a, for example. More generally, the isolator duct may be formed of a material that has an expanding quality or elasticity, such that the material responds to internal pressure by expanding such that the sensors described herein can detect the strain.

The combustor/burner 106 is configured to burn fuel with atmospheric oxygen to produce heat. The combustor/burner 106 includes a chamber (formed within a housing), fuel injection elements including the primary injector 300 (that inject fuel into the chamber), and an igniter that ignites the fuel.

The primary injector 300 is located between the isolator duct 104 and the proximal portion of the combustor/burner 106. The primary injector 300 is configured to modulate fuel flow to the engine system 100 to control back pressure produced by the engine system 100 to limit unstart. For example, a processor (not shown in FIG. 1) (e.g., the processor 202 of FIGS. 2, 3, and 4) may determine a measured strain distribution based on sensor values obtained from sensing strain sensors of the isolator duct and based on corresponding axial locations of the sensing strain sensors. The processor may control the primary injector 300 to modulate fuel flow to the engine system and control back pressure produced by the engine system based in part on the measured strain distribution. Controlling the back pressure mitigates the occurrence of unstart events.

Alternatively or in addition, the processor may estimate a shock train leading edge position of a shock train based on identifying a shock train leading edge in the measured strain distribution. Estimating the shock train leading edge position may proactively enable a processor to control the primary injector 300 to modulate fuel flow to the engine system. For example, the processor may use the measured strain distribution to estimate the axial position of the shock train leading edge along the isolator duct in order to determine the timing and the amount of fuel injected in the chamber and directly control the timing and fuel amounts, thereby, controlling the backpressure produced during fuel combustion in the chamber. By controlling engine elements that affect the backpressure, the processor controls the behavior of or how far the shock train travels to the front of the isolator duct. As an example, the processor 202 may utilize a lookup table stored in a memory storage (not shown) that for pressure value A, the frequency should be B and the amount of fuel should be C.

In other examples, calculations of the shock train leading edge position (or other calculations described herein) can be used to perform other actions such as sensing and avoiding unstart, modulating thrust, and monitoring system health and condition of the fuel injection and other systems. Alternatively or in addition, for example, the processor may control one or more bleed valves 503 to divert low-momentum boundary layer air (e.g., bleed air 501) to prevent premature unstart and/or bypass air to reduce combustion backpressure. For example, the bleed valves 503 may be controlled by the processor during high temperatures, vibrations, and dry environments. Alternatively or in addition, FIG. 1 shows representative locations of variable geometry 500 (e.g., a variable-geometry exhaust nozzle).

As described herein, strain sensors are used to measure strain on the outward surface of the isolator duct. A measured strain distribution is automatically determined showing sensor values (also referred to as strain values) obtained from the strain sensors versus the physical positions of these sensing strain sensors along the isolator duct (that is, the axial locations of the strain sensors outputting the sensor values). From this, the leading edge position of the shock train is determined. For example, leading edge position of the shock train may be determined as the axial location of the strain sensor sensing non-negligible strain that is located closest to the inlet opening of the isolator duct relative to the other strain sensors.

Figure 5:
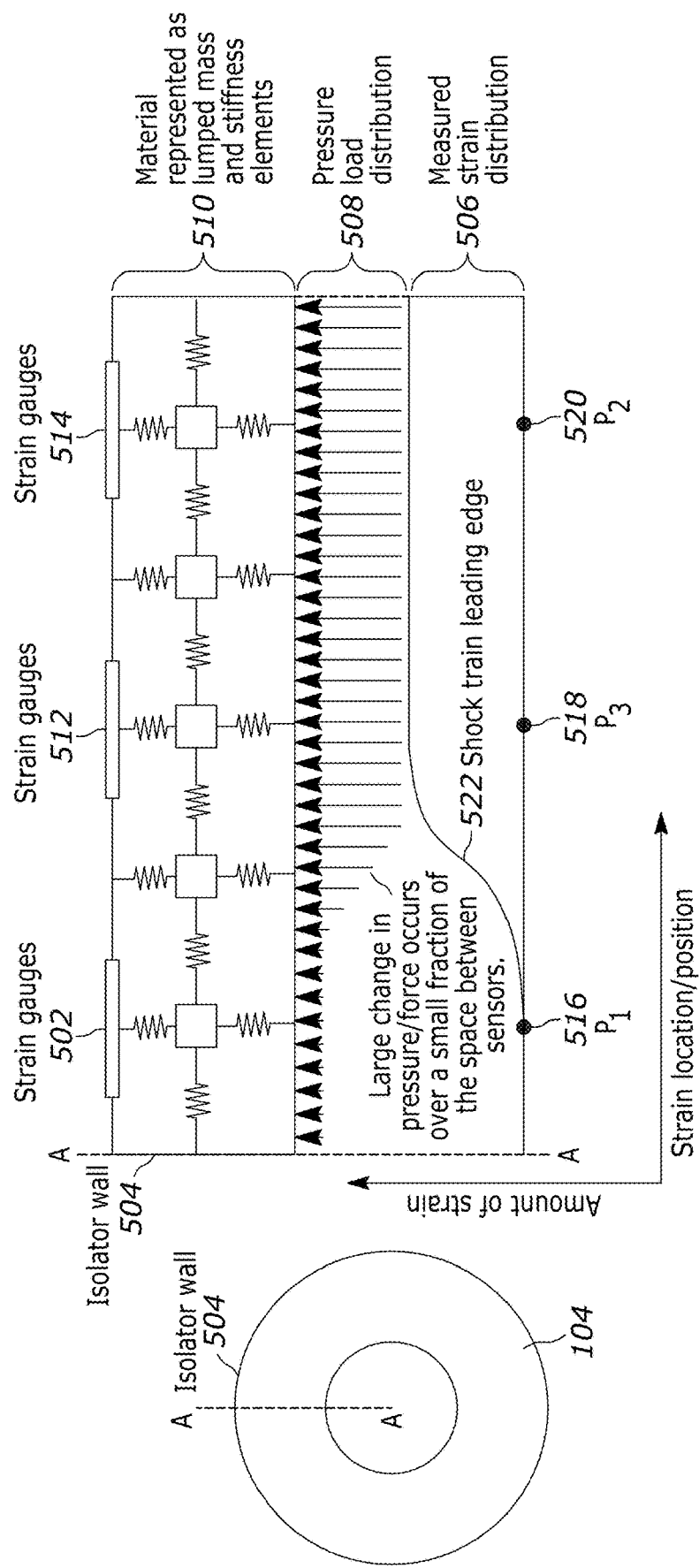
FIG. 5 shows an example measured strain distribution resulting from an example pressure exerted on the inner wall of an isolator duct in accordance with some embodiments.

In an illustrative non-limiting example, FIG. 5 shows an example measured strain distribution resulting from an example pressure exerted on the inner wall of an isolator duct. For example, as a shock train develops and grows toward the front of the isolator duct 104, pressure may be distributed or exerted against the inner wall of the isolator wall 504 (as illustratively represented by the pressure load distribution 508) deforming the shape of the outward surface of the isolator duct 104. The deformation causes strain in the material 510 of the isolator wall 504 that can be measured by the strain sensors 502, 512, 514 at location P1 516, location P3 518, and location P2 520, respectively, and illustratively represented by the measured strain distribution 506. As such, the strain sensing described herein leverages dynamic mechanical properties of the isolator wall 504 to create an inherently distributed isolator strain sensing system including both the isolator wall 504 and strain sensors 502, 512, 514 (e.g., the foil or wire strain gauges 204, the optical fiber Bragg grating strain gauges 304, and/or the optical interferometric hoop strain gauges 404).

Figure 2:
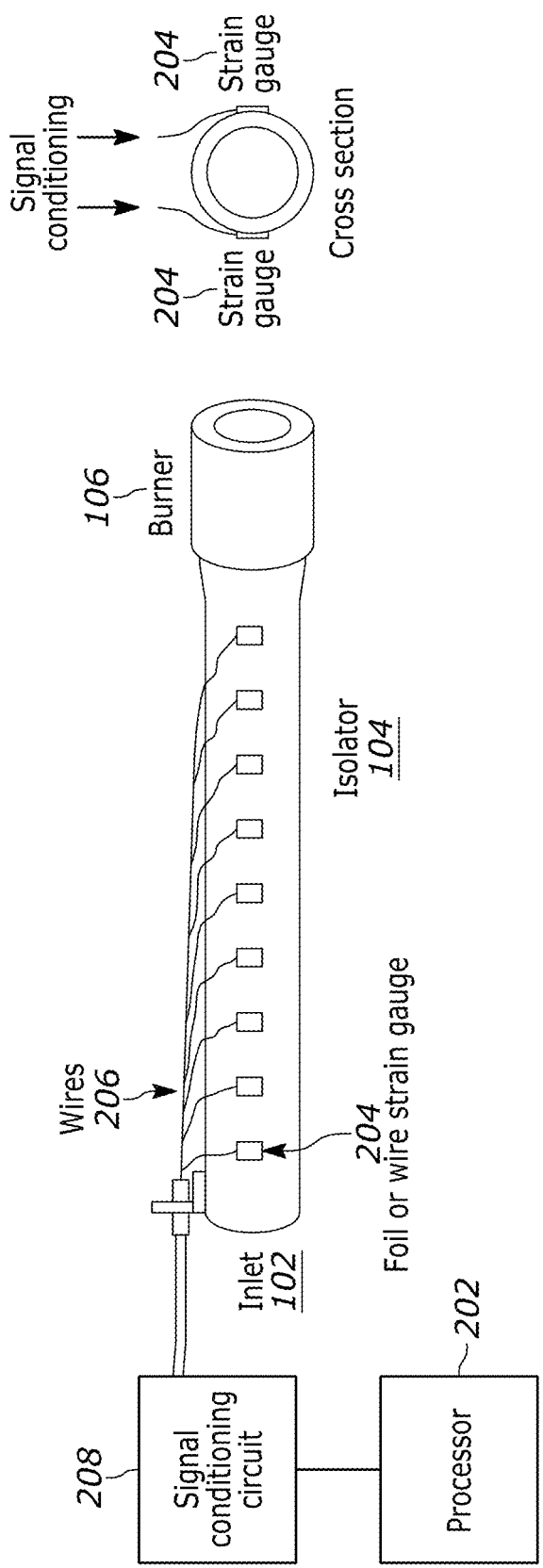
FIG. 2 shows an isolator strain sensing system including an example isolator duct with a plurality of strain sensors in accordance with some embodiments.
Figure 3:
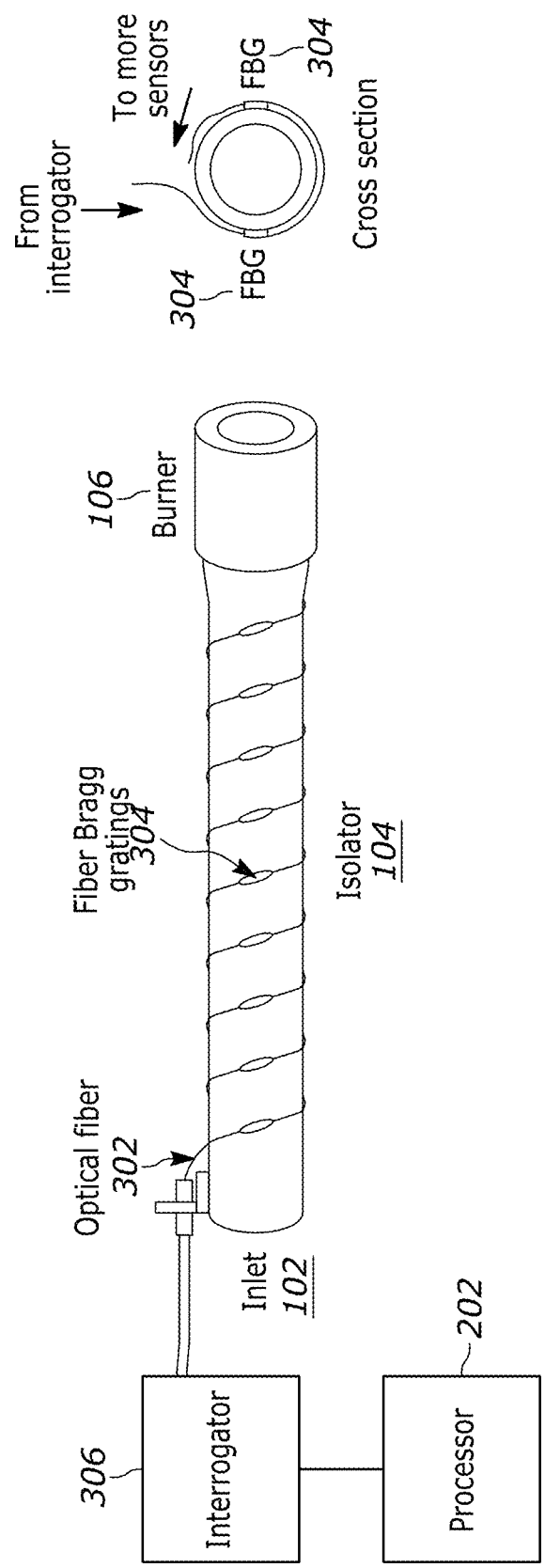
FIG. 3 shows an isolator strain sensing system including an example isolator duct with a plurality of strain sensors in accordance with some embodiments.
Figure 4:
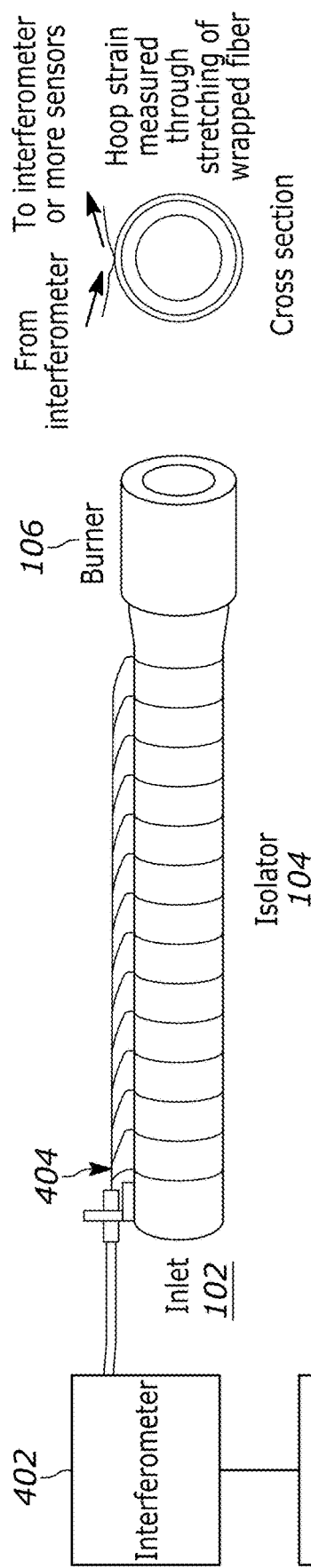
FIG. 4 shows an isolator strain sensing system including an example isolator duct with a plurality of strain sensors in accordance with some embodiments.

Each of FIGS. 2, 3, and 4 shows an isolator strain sensing system of an engine system 100 including an example isolator duct 104 with a plurality of strain sensors coupled to a processor 202 in accordance with some embodiments. In some embodiments, the processor 202 is any processing device such a microprocessor, a microcontroller, and/or any electronic circuitry capable of executing instructions of a computer program, such as arithmetic, logic, controlling, and/or input/output (I/O) operations stored in a memory. In some embodiments, the processor 202 may include a computer, a server, and/or an aircraft on-board computer.

The plurality of strain sensors may include foil or wire strain gauges 204 (as illustrated in FIG. 2), optical fiber Bragg grating strain gauges 304 (as illustrated in FIG. 3), and/or optical interferometric hoop strain gauges 404 (as illustrated in FIG. 4). In some embodiments, the plurality of strain sensors are distributed axially along a radially outward surface of the isolator duct 104. The isolator duct 104 may extend axially from an inlet side to a combustor/burner side. In some embodiments, the plurality of strain sensors sense strain on the radially outward surface of the isolator duct 104. In some embodiments, the plurality of strain sensors are distributed axially along the radially outward surface of the isolator duct 104 based on specified engine system requirements. For example, one example of an engine system requirement is finer resolution of shock train leading edge (STLE) position near the inlet side of the isolator and the strain sensors are distributed more densely in the axial dimension near the inlet side of the isolator than elsewhere along the isolator length so that this requirement is met. The isolator duct 104 shown in FIGS. 2-4 is a hollow tube made of titanium and/or steel, for example. The isolator duct 104 is coupled to the combustor/burner 106. The length and/or design structure of the isolator duct 104 are based on the aircraft engine and its corresponding system requirements. It will be appreciated that an ordinary person skilled in the art would understand that an isolator duct 104 may have a shape, length, wall thickness, and/or design structure different from those shown in FIGS. 2-4 but nonetheless still within the scope of the isolator strain sensing system described herein.

Foil or Wire Strain Gauges

As mentioned, the engine system 100 of FIG. 1 and/or the isolator strain sensing system of FIGS. 2, 3, and 4 may include a processor 202 coupled to the plurality of strain sensors. In some embodiments, the processor 202 obtains sensor values from one or more of the plurality of strain sensors. In an illustrative non-limiting example, in FIG. 2, the engine system 100 and/or the isolator strain sensing system may include the signal conditioning circuit 208 (also referred to as signal conditioners) coupled to a plurality of foil or wire strain gauges 204. The signal conditioning circuit 208 may condition (e.g., amplify, filter, convert, range match, and/or isolate) strain values received from the foil or wire strain gauges 204. In some embodiments, the foil or wire strain gauges 204 are coupled with the signal conditioning circuit 208 via the wires 206. For example, each strain gauge of the foil or wire strain gauges 204 is coupled with the signal conditioning circuit 208 (or coupled to a respective signal conditioner) via a respective wire of the wires 206 as illustrated in cross section shown in FIG. 2. In some embodiments, the wires 206 may include insulated copper wires and/or any metal wires capable of propagating electrical signal from the foil or wire strain gauges 204 to the signal conditioning circuit 208.

In some examples, paired strain gauges of the foil or wire strain gauges 204 are mounted on opposite side of the isolator duct 104 that attain a half-bridge configuration while also reducing the impact of lateral bending from the measured strain signal. In some other embodiments, the foil or wire strain gauges 204 are mounted on the isolator duct 104 to measure strain axially and/or circumferentially. In yet other examples, each of the foil or wire strain gauges 204 is mounted in such a way that the strain resolution is down to about one microstrain (pe). Alternatively or in addition, each of the foil or wire strain gauges 204 is mounted in such a way that a specific spatial resolution of the sensors is achieved (where "spatial resolution" refers to the number of sensors in a particular volume or area that is used to obtain strain values). In some examples, the spatial resolution may be 1 sensor per isolator duct diameter to 5 sensors per isolator duct diameter.

In some aspects, the processor 202 performs signal processing of output signals from the signal conditioning circuit 208. For example, the signal conditioning circuit 208 may receive strain values (may also be referred to as data signal) from the foil or wire strain gauges 204 as a shock train develops and grows toward the front of the isolator duct 104 due to the release of heat from the combustion of fuel. In some embodiments, the signal conditioning circuit 208 may condition (e.g., amplify, filter, convert, range match, and/or isolate) strain values received from the foil or wire strain gauges 204. Ordinary person skilled in the art would understand how the strain values or the strain data signal are conditioned to enable the processor 202 to process the strain values or the strain data signal into values or data that the processor can use to estimate a shock train leading edge position of a shock train.

In some embodiments, the processor 202 may receive a conditioned signal from the signal conditioning circuit 208. In some embodiments, the signal conditioning circuit 208 may be located a distance away (e.g., with portions of this circuitry located within less than 1 foot to 10 or more) from the isolator duct 104 to reduce signal-to-noise ratio that enters the signal conditioning circuit 208.

In some aspects, the processor 202 may determine a measured strain distribution based on the sensor values and/or axial locations of the plurality of strain sensors.

Referring to FIG. 5, an example measured strain distribution 506 is shown. As shown, the measured strain may be represented on the y-axis where the position of the strain is shown on the x-axis. For example, the processor 202 may determine the measured strain distribution 506 based on the processing of the conditioned signal received from the signal conditioning circuit 208 by associating locations of the sensing strain sensor and received strain values. For example, the axial locations may correspond to stored axial locations of the strain sensors obtained by the processor 202 from a memory (not shown). In aspects, during the installation of the isolator strain sensing system, the placement locations or positions of the strain sensors along the isolator duct are documented and stored in the memory.

Alternatively or in addition, the processor 202 may estimate a current shock train leading edge position based on identifying a shock train leading edge 522 in the measured strain distribution. For example, the processor 202 may periodically obtain sensor values from the foil or wire strain gauges 204. In some embodiments, the processor 202 may estimate a shock train leading edge position of a shock train traveling towards the front of the isolator duct based on the comparison of relative or absolute strain sensed at each strain gauge to a predetermined threshold or strain distribution stored in memory.

Optical Fiber Bragg Grating Strain Gauges

Figure 8:
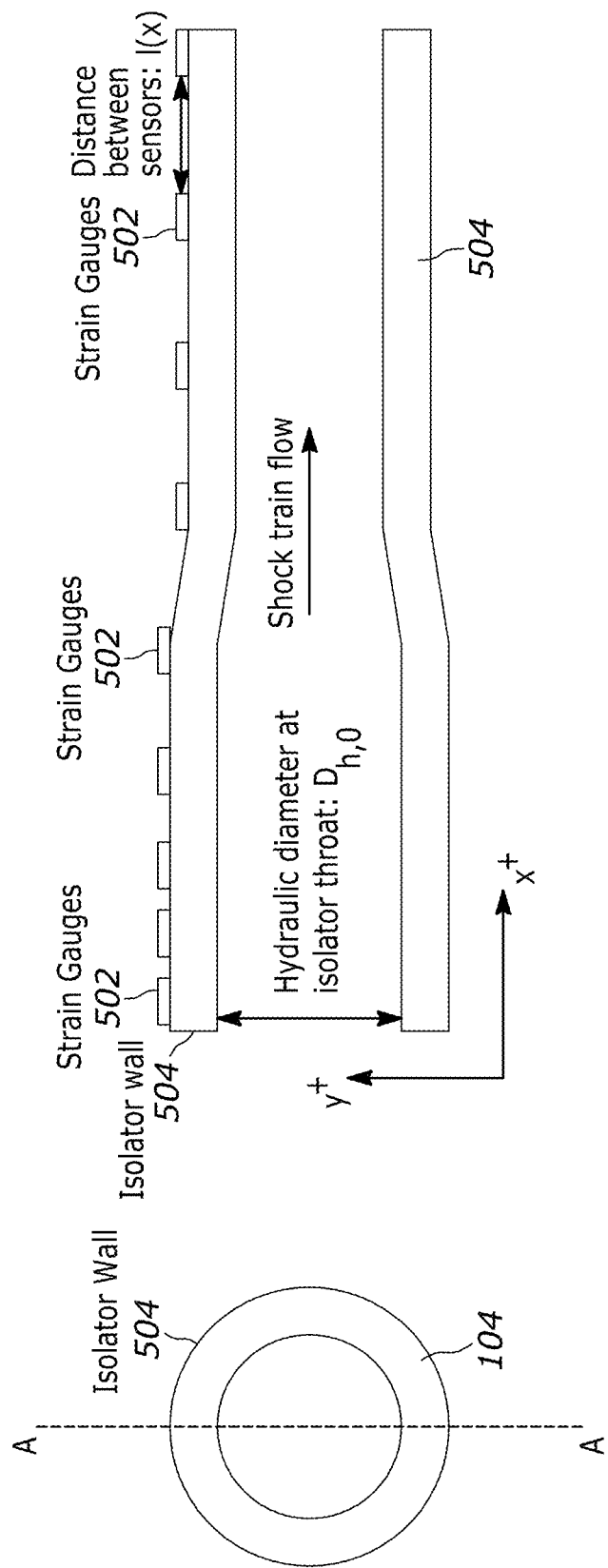
FIG. 8 illustrates exemplary number and placement of strain sensors for shock train leading edge position estimation in accordance with some embodiments.

In another illustrative non-limiting example, in FIG. 3, the engine system 100 includes a processor 202, and an interrogator 306, which is coupled to a plurality of optical fiber Bragg grating (FBG) strain gauges 304. The interrogator 306 is a device that measures the FBG strain gauges 304. For example, a swept wavelength laser of the interrogator 306 sends light into the optical fiber 302 at different visible or near-infrared wavelengths. The light may reflect off the etched Bragg gratings 304 in the optical fiber 302. A photodetector of the interrogator 306 measures the reflected light. A processing circuit of the interrogator 306 may compare the wavelengths of the reflected light to a wavelength reference (e.g., the wavelength of a reflected light when there is no strain in the outer surface of the isolator duct or a wavelength reference in the interrogator 306) as the outer surface of the isolator duct is deformed by the shock train (e.g., FIG. 8 shows the outer surface of the isolator duct being deformed as the shock train passes). The interrogator 306 may subsequently convert the information resulting from the comparison into engineering units that the processor 202 can use to estimate a shock train leading edge position of a shock train traveling to the front of the isolator duct.

In some aspects, each of the FBG strain gauges 304 comprise a short segment in the optical fiber 302 that reflects certain wavelengths of light while transmitting others. For example, the refractive index of the fiber core of the optical fiber 302 changes along the length of the FBG periodically between high-index and low-index. This creates a wavelength-specific dielectric mirror that reflects certain wavelengths and transmits others. Other elements of FIG. 3 have been described elsewhere herein and these descriptions will not be repeated here.

In some aspects, paired optical FBG strain gauges are mounted on opposite sides of the isolator duct 104 so that the impact of isolator duct bending can be cancelled from desired signals as illustratively represented in the cross section shown in FIG. 3. In this example, bending of the isolator duct may induce equal and opposite strain in the two opposite FBGs. By summing the strains measured by the opposite FBGs, the impact of bending is removed, exposing the common strain due to the pressure wave in the isolator duct 104. In some embodiments, the optical FBG strain gauges 304 are mounted on the isolator duct 104 to measure strain axially and/or circumferentially. In some embodiments, each of the optical FBG strain gauges 304 is mounted in such a way that the strain resolution is down to about one microstrain (pe). Alternatively or in addition, each of the optical FBG strain gauges 304 is mounted in such a way that the spatial resolution achieved may be 1 sensor per isolator duct diameter to 5 sensors per isolator duct diameter. In some embodiments, the isolator strain sensing system described in FIG. 3 is fully immune to electromagnetic interference (EMI) and cross-coupling since light is used to measure strain.

In one example of the operation of the strain sensing system of FIG. 3, the interrogator 306 obtains sensor values from the plurality of optical FBG strain gauges 304 connected along one or more optical fibers 302 by acquiring data simultaneously and/or at different sampling rates. In some embodiments, the interrogator 306 may measure all optical FBG strain gauges 304 on a single fiber through wavelength or time multiplexing. For example, during data acquisition, the interrogator 306 may measure the wavelength associated with the light reflected by the optical FBG strain gauges 304 and then converts the light into engineering units usable for processing. The processor 202 may perform signal processing of output signals from the interrogator 306 to determine the measured strain distribution based on the sensor values and/or axial locations of the optical FBG strain gauges 304. Alternatively or in addition, the processor 202 may estimate a shock train leading edge position based on identifying a shock train leading edge in the measured strain distribution as described herein. For example, the processor 202 may similarly process the corresponding strain values or strain data received from the interrogator 306 as the processor 202 processes the corresponding strain values or strain data received from the signal conditioning circuit 208 of FIG. 2.

Optical Interferometric Hoop Strain Gauges

In another illustrative non-limiting example, in FIG. 4, the engine system 100 includes a processor 202, and an interferometer 402, which are coupled to one or more optical interferometric hoop strain gauges 404. The interferometer 402 may include one or more light sources, optical devices (e.g., a beam-splitters, circulators, fiber delay lines, optical switches, and mirrors), and a photodetector. For example, a light source may transmit visible or near infrared laser light to a beam-splitter. The beam-splitter splits the beam of light and separately sends each beam into an optical interferometric hoop strain gauge and a reference fiber delay line. At the end of the optical interferometric hoop strain gauge and the reference fiber delay line are mirrors that reflect the light back into the beam-splitter. The beam-splitter then combines the light from the optical interferometer hoop strain gauge and the reference fiber delay line and sends the combined light (also referred to as an optical signal) to the photodetector. The photodetector may convert the combined light into an electrical signal. The interferometer 402 may contain multiple light sources, beam splitters, fiber delay lines, mirrors, and photodetectors to measure multiple optical interferometric hoop strain gauges. Alternatively, an optical switch or splitters in the interferometer 402 can be used to enable sequential or parallel measurement of multiple optical interferometric hoop strain gauges with common components. The interferometer 406 may subsequently convert the electrical signals from the photodiodes into engineering units that the processor 202 can use to estimate a current shock train leading edge position of a shock train traveling to the front of the isolator duct as described herein.

Other elements of FIG. 4 have been described elsewhere herein, and these descriptions will not be repeated here.

In some aspects, the interferometer 402 may be coupled to each interferometric hoop strain gauge. For example, an optical interferometric hoop strain gauge may correspond to an optical fiber wrapped around the isolator duct 104. In some embodiments, having multiple optical interferometric hoop strain gauges 404 wrapped around the isolator duct 104 and aggregating the measured hoop strain for each optical fiber may eliminate the impact of fiber bending. In some embodiments, due to interference of light from different sides of an optical fiber and/or different locations along an optical fiber, dynamic hoop strains can be measured along the length of the isolator duct 104.

In some other aspects, an interferometer 402 determines an interference pattern of lights reflected inside the optical interferometric hoop strain gauges 404 and outputs data associated with the interference pattern. For example, the interferometer 402 may measure corresponding hoop strain produced by the stretching of one or more optical fibers along the axial locations of the isolator duct 104. Alternatively or in addition, the processor 202 may receive and process the measured data output by the interferometer 402 to determine the measured strain distribution based on the strain sensor values and/or axial locations of the optical interferometric hoop strain gauges 404. For example, the processor 202 may associate strain sensor values with the corresponding sensor axial locations to define a spatial distribution of circumferential strain along the isolator length. Alternatively or in addition, the processor 202 may estimate a shock train leading edge position based on identifying a shock train leading edge in the measured strain distribution as described herein. For example, the processor 202 may similarly process the corresponding strain values or strain data received from the interferometer 402 as processor 202 processes the corresponding strain values or strain data received from the signal conditioning circuit 208 of FIG. 2.

In yet other aspects, each of the optical interferometric hoop strain gauges 404 is mounted in such a way that the strain resolution is down to about 0.01 microstrain (μɛ). Alternatively or in addition, each of the optical interferometric hoop strain gauges 404 is mounted in such a way that the spatial resolution achieved may be 1 sensor per isolator duct diameter to 50 sensors per isolator duct diameter with a single fiber. In some embodiments, the isolator strain sensing system described in FIG. 4, is fully immune to electromagnetic interference (EMI) and cross-coupling since light is used to measure strain.

One advantage of the isolator strain sensing systems described herein is that the sensing elements (e.g., the foil or wire strain gauges 204, the optical fiber Bragg grating strain gauges 304, and/or the optical interferometric hoop strain gauges 404) may rapidly detect dynamic strain variations along the surface of the isolator duct 104 and inform the inferencing of shock train leading edge position (or location) as described herein; thereby, significantly improving spatial and temporal resolution. In some embodiments, the processor 202 may infer the shock train leading edge position and/or the shock train leading edge position is regressed by high frequency (e.g., approximately 1 kHz) evaluation. Alternatively or in addition, the processor 202 may calculate comparison of statistical features from spatial and temporal distributions of measured strain. For example, standard deviation of strain values collected at each sensor over a number of contiguous sampling periods may be compared to similarly calculated standard deviations of each sensor in the sensor distribution at the current and/or previous times.

Another advantage of the isolator strain sensing system described herein is that the small volume and weight of the strain sensing elements enable significantly increased measurement density compared to the traditional pressure-based methods, and thereby, enable unique measurement patterns over the exterior surface of the isolator wall 504 (i.e., as compared to linear rows of sparsely separated pressure transducers). Thus, increased spatial resolution can be attained from even traditionally imprecise algorithms.

Figure 6:
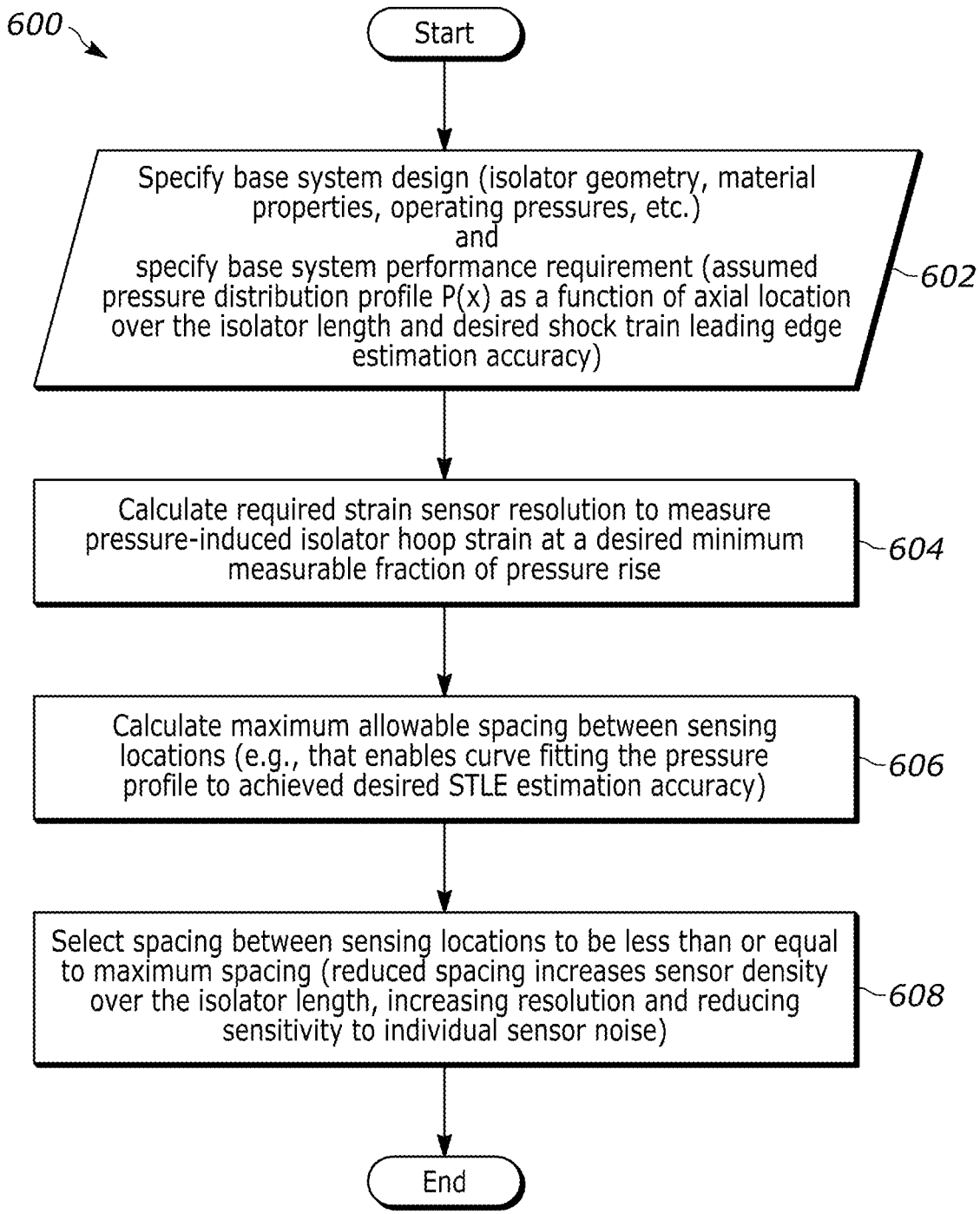
FIG. 6 shows a flow diagram of an exemplary method for constructing an isolator strain sensing system of an engine system in accordance with some embodiments.

FIG. 6 shows a flow diagram of an exemplary method 600 for constructing an isolator strain sensing system of an engine system 100 in accordance with some embodiments. In some embodiments, the engine system 100 may include an air-breathing propulsion engine. The method 600 includes, at step 602, specifying base system design (e.g., geometry, material properties, and/or operating pressures of the isolator duct 104, to name a few examples). For example, the processor 202 may receive data associated with the base system design. In another example, the processor 202 may access a memory to retrieve data associated with the base system design. Alternatively or in addition, step 602 may further include specifying base system performance requirement (e.g., an assumed pressure distribution profile P(x) as a function of axial location over the length of the isolator duct 104 and desired shock train leading edge estimation accuracy). The assumed pressure distribution profile P(x) is used to inform estimation of the shock train leading edge from the measured strain distribution. The desired accuracy is used to determine the required spatial distribution and type of strain sensors used and inform the design of shock train leading edge position estimation algorithms. For example, the processor 202 may receive data associated with the base system performance requirement. In another example, the processor 202 may access a memory to retrieve data associated with the base system performance requirement.

In some embodiments, the method 600 may include, at step 604, calculating required strain sensor resolution to measure pressure-induced isolator hoop strain at a desired minimum measurable fraction of pressure rise. In one example of a calculation, the required strain sensor resolution is calculated as a fraction of the minimum pressure-induced hoop strain at the shock train leading edge calculated from the isolator's geometry and material properties as well as system operating conditions. Alternatively or in addition, the method 600 may include, at step 606, calculating maximum allowable spacing between sensing locations (e.g., that enables curve fitting the pressure profile to achieve desired shock train leading edge (STLE) estimation accuracy). For example, the maximum allowable spacing may be calculated as the largest spacing between sensors such that, for a given sensor accuracy and curve-fitting approach, the maximum error between the true pressure profile and estimated pressure profile is less than or equal to that necessary for estimating the location of the shock train leading edge with the required spatial accuracy (e.g., as calculated by worst-case uncertainty stack). Alternatively or in addition, the method 600 may include, at step 608, selecting spacing between sensing locations (e.g., between strain sensors) to be less than or equal to maximum spacing calculated in step 606. In some embodiments, reduced spacing may increase sensor density over the length of the isolator duct 104; thereby, increasing resolution and reducing sensitivity to individual sensor noise.

Figure 7:
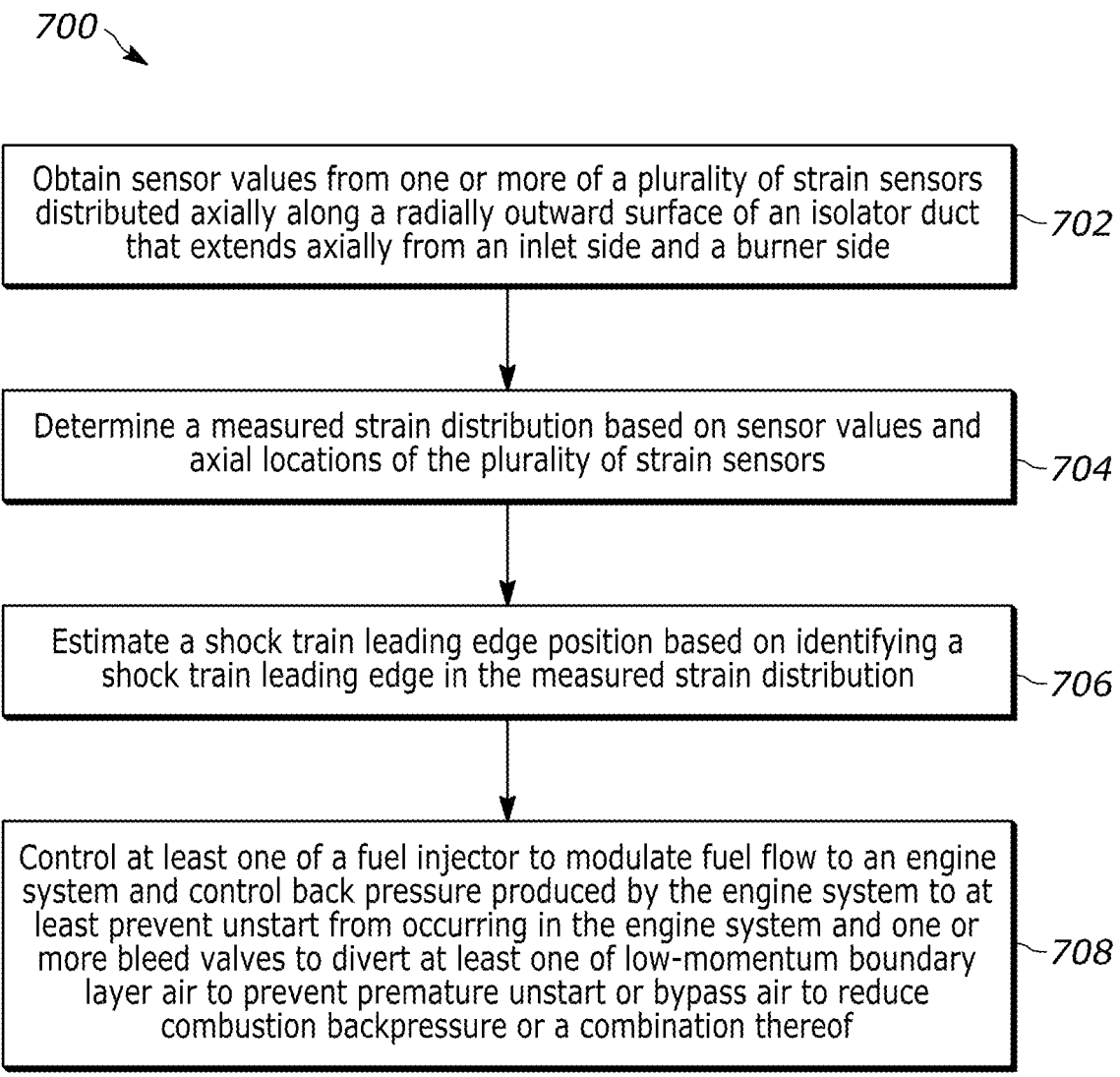
FIG. 7 shows a flow diagram of an exemplary method for operating an isolator strain sensing system of an engine in accordance with some embodiments.

FIG. 7 shows a flow diagram of an exemplary method 700 for operating an isolator strain sensing system of an engine in accordance with some embodiments. The method 700 includes, at step 702, obtaining, by a processor 202, sensor values from one or more of a plurality of strain sensors (e.g., the foil or wire strain gauges 204 of FIG. 2, the optical fiber Bragg grating strain gauges 304 of FIG. 3, and/or the optical interferometric hoop strain gauges 404 of FIG. 4) distributed axially along a radially outward surface of an isolator duct 104 that extends axially from an inlet side and a burner side. In some embodiments, the sensor values are strain data sensed by the plurality of strain sensors on the radially outward surface of the isolator duct 104.

Alternatively or in addition, the method 700 may include, at step 704, determining, by the processor 202, a measured strain distribution based on the sensor values and axial locations of the plurality of strain sensors. Alternatively or in addition, the method 700 may include, at step 706, estimating, by the processor 202, a shock train leading edge position based on identifying a shock train leading edge in the measured strain distribution. In some embodiments, the engine may include an air-breathing propulsion engine.

Alternatively or in addition, the method 700 may include, at step 708, control, based on the estimated shock train leading edge position, at least one of a fuel injector to modulate fuel flow to the engine system and control back pressure produced by the engine system to at least prevent unstart from occurring in the engine system and one or more bleed valves to divert low-momentum boundary layer air to prevent premature unstart and/or bypass air to reduce combustion backpressure.

Alternatively or in addition, estimated shock train leading edge position may be used for several purposes beyond preventing unstart. In some embodiments, control actions may be performed based on sensor data and calculations made to estimate the shock train leading edge position. For example, the sensed strain data can be used to infer shock train leading edge position, estimate performance (i.e., thrust), and perform monitoring/trending of system health (e.g., for reporting system condition). Alternatively or in addition, in estimating the shock train leading edge position, the method 700 may include performing an estimation of a strain distribution profile relative to the measured strain distribution. Alternatively or in addition, in estimating the shock train leading edge position, the method 700 may further include determining the shock train leading edge position as an axial position on the estimation that meets an operational definition of the shock train leading edge position. In some embodiments, the operational definition of the shock train leading edge position is accessed by the processor 202 from a memory having a plurality of stored shock train leading edge positions along with corresponding stored base system designs and/or based system performance requirements. In some embodiments, a regression analysis may be used in performing the estimation of the strain distribution profile relative to the measured strain distribution. In some embodiments, the axial position corresponds to a most upstream axial position calculated from the estimation relative to other axial positions on a curve fit.

Alternatively or in addition, in determining the measured strain distribution, the method 700 may include applying, by the processor 202, temperature compensation to determine one or more effects of thermal stress on isolator strain. Alternatively or in addition, in determining the measured strain distribution, the method 700 may further include removing the one or more effects of the thermal stress from the sensor values. Alternatively or in addition, in applying the temperature compensation, the method 700 may further include using, by the processor 202, one of a measured isolator temperature profile or a calculated isolator temperature profile. In some embodiments, the measured isolator temperature profile may correspond to the temperature of the isolator duct 104 that is received by the processor 202 over a period of time. In some embodiments, the calculated isolator temperature profile may correspond to an estimated temperature profile of the isolator duct 104 based at least on a stored temperature profile of the isolator duct 104.

Alternatively or in addition, the method 700 may include estimating the shock train leading edge position based on converting the measured strain distribution to a calculated pressure distribution. Alternatively or in addition, in converting the measured strain distribution to the calculated pressure distribution, the method 700 may further include determining, by the processor 202, pressure from an induced stress based on material and geometric dimensions of the isolator duct 104.

In some aspects, the method 700 includes generating an unstart onset alert when the shock train leading edge position is below a distance threshold from the inlet side. In some other examples, in generating the unstart onset alert, the method 700 includes causing, by the processor 202, to display the unstart onset alert on a display screen and/or to illuminate a device to indicate the unstart onset alert.

In other examples, the method 700 includes automatically executing electronic instructions that cause one or more preprogrammed events or actions to be performed. The instructions are stored in an electronic memory and are executed in response to the unstart onset alert generated. For example, the processor may automatically cause the fuel injector to modulate fuel flow to the engine system to control back pressure produced by the engine system to prevent unstart. In another example, the processor 202 may cause execution of automatic flight and engine controls to minimize flight condition asymmetry. In still another example, the processor 202 may cause the release of high pressure fluid to reduce the strength of back pressure and stop upstream propagation of unstart. In other words, the processor 202 electronically controls actions and operations of various engine components. These control actions may adjust or control valve positions, switches, levers, or actuation devices to mention a few examples.

FIG. 8 illustrates exemplary number and placement of strain sensors for shock train leading edge position estimation in accordance with some embodiments. In some embodiments, the number of strain sensors or sensor densities distributed axially along a radially outward surface of the isolator duct 104 are in accordance with $0.25 \leq I(x)/D_{h,0} \leq 2$, where $I(x)$ corresponds to the distance between strain sensors and $D_{h,0}$ corresponds to hydraulic diameter at isolator throat. Sensor densities outside the range provided by the $0.25 \leq I(x)/D_{h,0} \leq 2$ may lead to an estimation of the shock train leading edge position that is outside the predetermined desired accuracy range. For example, higher sensor density may be expected to give diminishing returns while lower sensor densities may be expected to degrade shock train leading edge position estimation performance beyond utility. In some embodiments, strain sensors are individually activated or deactivated such that in an example where there is a higher sensor density, the strain sensors can be spaced out (e.g., by activating some and leaving other deactivated) and/or combined others based on calculations from the processor 202 for what is optimal to accommodate redundancy and/or to accommodate sensor failures.

In some embodiments, sensor density may vary along the length of the isolator duct 104, where higher sensor densities can be used in regions where more precise shock train leading edge position estimation may be required. In some embodiments, sensor density may be increased at the fore end of the isolator duct 104 to provide improved spatial resolution of shock train leading edge (STLE) estimation as an engine (e.g., a dual-mode ramjet (DMRJ), and/or any air-breathing jet engine) approaches unstart.

Figure 9:
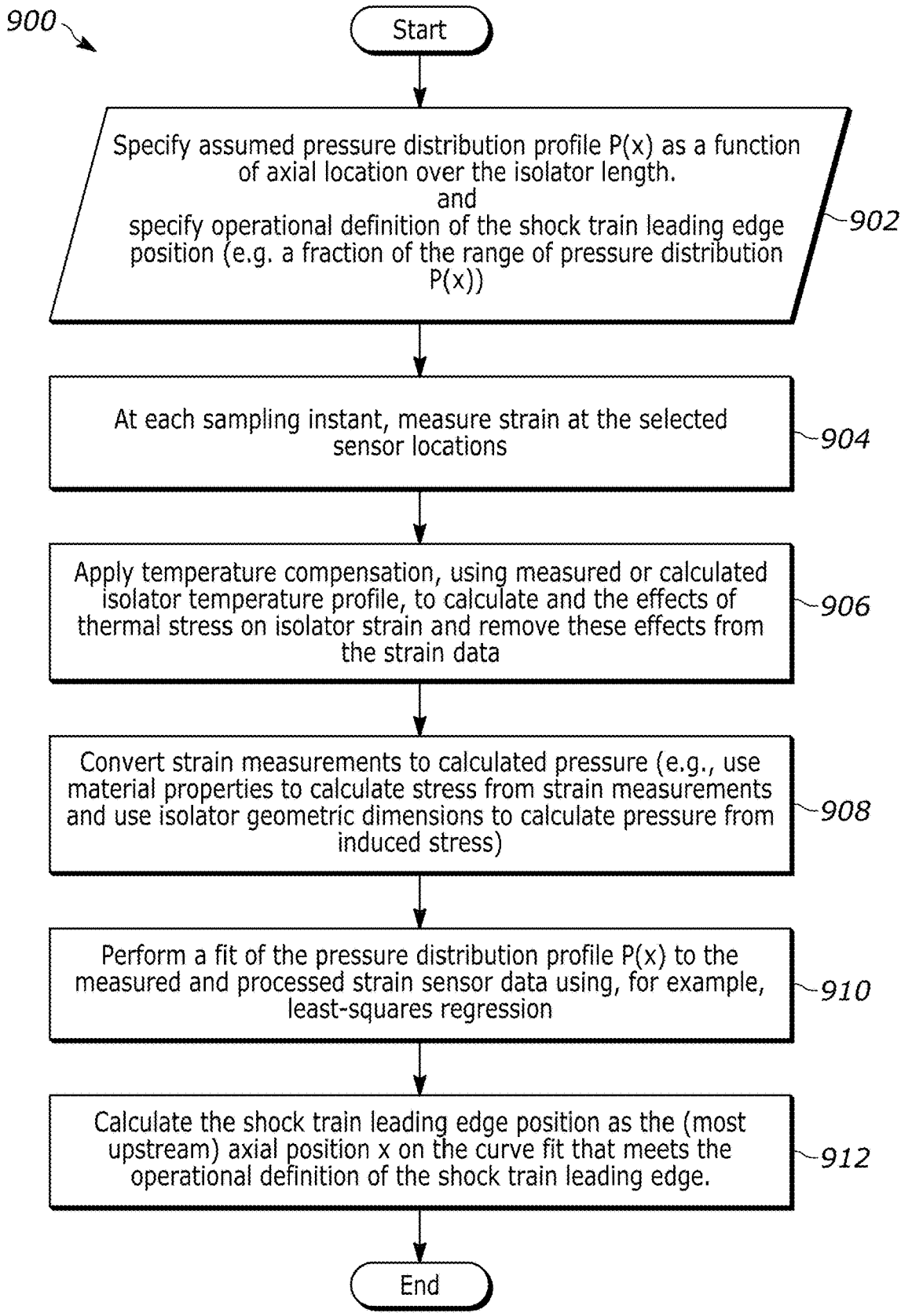
FIG. 9 shows a flow diagram of an exemplary method 900 for determining a number and placement of strain sensors for shock train leading edge estimation in accordance with some embodiments.

FIG. 9 shows a flow diagram of an exemplary method 900 for estimating the shock train leading edge position in accordance with some embodiments. The method includes, at step 902, specifying assumed pressure distribution profile P(x) as a function of axial location over the length of the isolator duct 104. In some embodiments, the step 902 may further include specifying operational definition of the shock train leading edge position (e.g., a fraction of the range of pressure distribution P(x)). For example, the operation definition of the leading edge position may specify the shock train leading edge as x % of pressure distribution P(x) or x % of a normalized pressure distribution to be calculated from P(x) at step 912.

Alternatively or in addition, the method 900 may include, at step 904, measuring strain (e.g., hoop strain) at the selected sensor locations at each sampling instant. In some embodiments, strain measurements may be taken along one or more directions (including those which can be used to derive hoop strain and axial strain) at each sensing location. Hoop strain may correspond to a surface deformation due to a change in the circumferential length of the material of the isolator duct 104. Axial strain may correspond to a surface deformation due to a change in the longitudinal length of the material of the isolator duct 104. For example, FIG. 8 shows the circumference length being deformed as the shock train flow travels from left to right of the figure.

In some embodiments, the processor 202 may cause the measured strain to be subjected to signal conditioning (e.g., low-pass or anti-aliasing filtering, band-pass filtering, and/or amplification) prior to executing an estimation algorithm that estimates the shock train leading edge position. In some embodiments, the processor 202 may cause additional filtering of an output of the estimation algorithm to smooth high-frequency variations in the estimated shock train leading edge position.

Alternatively or in addition, the method 900 may include, at step 906, applying temperature compensation, using measured or calculated isolator temperature profile, to calculate and the effects of thermal stress on isolator strain and remove these effects from the strain data. For example, correlations between temperature and strain may be preloaded into memory and accessed by the processor 202 to calculate the effects of thermal stress at the current temperature and correct the strain values to isolate pressure-induced strain.

Alternatively or in addition, the method 900 may include, at step 908, converting strain measurements to calculated pressure (e.g., use material properties to calculate stress from strain measurements and use isolator geometric dimensions to calculate pressure from induced stress). The reason this step would be performed is to enable comparison of the calculated pressure distribution profile obtained from strain measurements to the pressure distribution profile P(x).

Alternatively or in addition, the method 900 may include, at step 910, performing a fit of the pressure distribution profile P(x) to the measured and processed strain sensor data using, for example, least squares regression. The reason this step would be performed is to produce a calculated pressure distribution profile from which the shock train leading edge may be estimated.

Alternatively or in addition, the method 900 may include, at step 912, calculating the shock train leading edge position as (e.g., the most upstream) axial position x on the curve fit that meets the operational definition of the shock train leading edge. In some embodiments, the most upstream axial position x that meets the predefined definition of the shock train leading edge position may be approximated by applying the operational definition of the shock train leading edge position directly to the distribution of strain measurements without first fitting to a predetermined pressure distribution profile.

Installing pressure sensors along an isolator duct to directly measure the location of the shock train can be limiting since the number of sensing locations are limited due to the pressure sensors' size. On the contrary, the distributed strain sensing approaches described herein do not suffer the same limitation. Consequently, the distributed strain sensing approaches described herein provide an accurate spatial and temporal resolution of the shock train location and morphology during an engine operation. Moreover, by providing the measurement of the location to a real-time or near-real time estimation and control algorithms as described herein, the operating conditions during an engine operation can be manipulated to control position and geometry of the shock train, which can be used to enable unstart prediction and prevention as well as smaller, lower-weight engine and vehicle designs.

In an illustrative non-limiting example, distributed fiber optic strain sensing based on Rayleigh backscatter and/or fiber Bragg gratings can measure 10 seconds to 100 seconds of positions with a single instrument over a single fiber. In another example, a series of Sagnac interferometers can measure hoop strains in real-time or near real-time using a shared optical source and compact detector arrays. In some embodiments, these systems have been demonstrated to measure strain changes at the nano-strain scale.

Moreover, one of the approaches provided herein discloses an indirect measurement of shock train in an isolator through distributed strain measurements on the external surface of the isolator duct. Further, another one of the approaches provided herein discloses high-sensitivity hoop strain measurements using interferometry to measure the strain caused by the pressure inside an isolator duct. Furthermore, another one of the approaches provided herein discloses high-sensitivity surface strain measurements using fiber Bragg gratings to measure the strain caused by the pressure inside an isolator duct. One of the many advantages of the approaches described herein is a reduction in wall penetrations and controller interfaces (including wiring) relative to the conventional approach, such installation of pressure sensors along the isolator duct.

Further aspects of the present disclosure are provided by the subject matter of the following clauses:

An engine system comprising: an isolator duct extending axially from an inlet side to a burner side; a plurality of strain sensors distributed axially along a radially outward surface of the isolator duct and configured to sense strain on the radially outward surface of the isolator duct; and a processor coupled to the plurality of strain sensors, the processor configured to: obtain sensor values from one or more of the plurality of strain sensors; determine a measured strain distribution based on the sensor values and axial locations of the plurality of strain sensors; estimate a shock train leading edge position of a shock train based on identifying a shock train leading edge in the measured strain distribution, wherein the engine system comprises an air-breathing propulsion engine; and control, based on the estimated shock train leading edge position, at least one of a fuel injector to modulate fuel flow to the engine system and control back pressure produced by the engine system to at least prevent unstart from occurring in the engine system and one or more bleed valves to at least one of divert low-momentum boundary layer air to prevent premature unstart or bypass air to reduce combustion backpressure or a combination thereof.

The engine system of any preceding clause wherein the plurality of strain sensors comprise at least one of a foil strain gauge, a wire strain gauge, an optical fiber Bragg grating strain gauge, a ceramic strain gauge, or an optical interferometric hoop strain gauge.

The engine system of any preceding clause wherein the processor is further configured to generate an unstart onset alert when the shock train leading edge position is below a distance threshold from the inlet side.

The engine system of any preceding clause wherein the shock train leading edge position is estimated by: performing an estimation of a strain distribution profile relative to the measured strain distribution; and determining the shock train leading edge position as an axial position on the estimation that meets an operational definition of the shock train leading edge position.

The engine system of any preceding clause wherein a regression analysis is used in performing the estimation of the strain distribution profile relative to the measured strain distribution.

The engine system of any preceding clause wherein the axial position corresponds to a most upstream axial position calculated from the estimation relative to other axial positions on a curve fit.

The engine system of any preceding clause wherein in determining the measured strain distribution, the processor is configured to: apply temperature compensation to determine one or more effects of thermal stress on isolator strain; and remove the one or more effects of the thermal stress from the sensor values.

The engine system of any preceding clause wherein in applying the temperature compensation, the processor is configured to use one of a measured isolator temperature profile or a calculated isolator temperature profile.

The engine system of any preceding clause wherein the processor is further configured to estimate the shock train leading edge position based on converting the measured strain distribution to a calculated pressure distribution.

The engine system of any preceding clause wherein in converting the measured strain distribution to the calculated pressure distribution, the processor is configured to: determine pressure from an induced stress based on material and geometric dimensions of the isolator duct.

The engine system of any preceding clause wherein the plurality of strain sensors are distributed axially along the radially outward surface of the isolator duct based on specified engine system requirements.

A method for an engine system, the method comprising: obtaining, by a processor, sensor values from one or more of a plurality of strain sensors distributed axially along a radially outward surface of an isolator duct that extends axially from an inlet side and a burner side, wherein the sensor values are strain data sensed by the plurality of strain sensors on the radially outward surface of the isolator duct; determining, by the processor, a measured strain distribution based on the sensor values and axial locations of the plurality of strain sensors; estimating, by the processor, a shock train leading edge position of a shock train based on identifying a shock train leading edge in the measured strain distribution, wherein the engine system comprises an air-breathing propulsion engine; and controlling, based on the estimated shock train leading edge position, at least one of a fuel injector to modulate fuel flow to the engine system and control back pressure produced by the engine system to at least prevent unstart from occurring in the engine system and one or more bleed valves to at least one of divert low-momentum boundary layer air to prevent premature unstart or bypass air to reduce combustion backpressure or a combination thereof.

The method of any preceding clause wherein the plurality of strain sensors comprise at least one of a foil strain gauge, a wire strain gauge, an optical fiber Bragg grating strain gauge, a ceramic strain gauge, or an optical interferometric hoop strain gauge.

The method of any preceding clause further comprising generating, by the processor, an unstart onset alert when the shock train leading edge position is below a distance threshold from the inlet side.

The method of any preceding clause wherein the shock train leading edge position is estimated by: performing, by the processor, an estimation of a strain distribution profile relative to the measured strain distribution; and determining, by the processor, the shock train leading edge position as an axial position on the estimation that meets an operational definition of the shock train leading edge position.

The method of any preceding clause wherein a regression analysis is used in the performing the estimation of the strain distribution profile relative to the measured strain distribution, and wherein the axial position corresponds to a most upstream axial position on the estimation relative to other axial positions on the estimation.

The method of any preceding clause wherein the determining of the measured strain distribution comprises: applying, by the processor, temperature compensation to determine one or more effects of thermal stress on isolator strain; and removing, by the processor, the one or more effects of the thermal stress from the sensor values.

The method of any preceding clause wherein the applying of the temperature compensation comprises using one of a measured isolator temperature profile or a calculated isolator temperature profile.

The method of any preceding clause further comprising estimating, by the processor, the shock train leading edge position based on converting the measured strain distribution to a calculated pressure distribution.

The method of any preceding clause wherein the converting of the measured strain distribution to the calculated pressure distribution comprises determining, by the processor, pressure from an induced stress based on material and geometric dimensions of the isolator duct.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

The invention claimed is:

1. An engine system comprising:
   an isolator duct extending axially from an inlet side to a burner side;
   a plurality of strain sensors distributed axially along a radially outward surface of the isolator duct and configured to sense strain on the radially outward surface of the isolator duct; and
   a processor coupled to the plurality of strain sensors, the processor configured to:
      obtain sensor values from one or more of the plurality of strain sensors;
      determine a measured strain distribution based on the sensor values and axial locations of the plurality of strain sensors;
      estimate a shock train leading edge position of a shock train based on identifying a shock train leading edge in the measured strain distribution, wherein the engine system comprises an air-breathing propulsion engine; and
      control, based on the estimated shock train leading edge position, at least one of a fuel injector to modulate fuel flow to the engine system and control back pressure produced by the engine system to at least prevent an unstart from occurring in the engine system and one or more bleed valves to at least one of divert low-momentum boundary layer air to prevent premature unstart or bypass air to reduce combustion backpressure or a combination thereof.

2. The engine system of claim 1, wherein the plurality of strain sensors comprise at least one of a foil strain gauge, a wire strain gauge, an optical fiber Bragg grating strain gauge, a ceramic strain gauge, or an optical interferometric hoop strain gauge.

3. The engine system of claim 1, wherein the processor is further configured to generate an unstart onset alert when the shock train leading edge position is below a distance threshold from the inlet side.

4. The engine system of claim 1, wherein the shock train leading edge position is estimated by:
   performing an estimation of a strain distribution profile relative to the measured strain distribution; and
   determining the shock train leading edge position as an axial position on the estimation that meets an operational definition of the shock train leading edge position.

5. The engine system of claim 4, wherein a regression analysis is used in performing the estimation of the strain distribution profile relative to the measured strain distribution.

6. The engine system of claim 4, wherein the axial position corresponds to a most upstream axial position calculated from the estimation relative to other axial positions on a curve fit.

7. The engine system of claim 1, wherein in determining the measured strain distribution, the processor is configured to:
   apply temperature compensation to determine one or more effects of thermal stress on isolator strain; and
   remove the one or more effects of the thermal stress from the sensor values.

8. The engine system of claim 7, wherein in applying the temperature compensation, the processor is configured to use one of a measured isolator temperature profile or a calculated isolator temperature profile.

9. The engine system of claim 1, wherein the processor is further configured to estimate the shock train leading edge position based on converting the measured strain distribution to a calculated pressure distribution.

10. The engine system of claim 9, wherein in converting the measured strain distribution to the calculated pressure distribution, the processor is configured to:
    determine pressure from an induced stress based on material and geometric dimensions of the isolator duct.

11. The engine system of claim 1, wherein the plurality of strain sensors are distributed axially along the radially outward surface of the isolator duct based on specified engine system requirements.

12. A method for an engine system, the method comprising:
    obtaining, by a processor, sensor values from one or more of a plurality of strain sensors distributed axially along a radially outward surface of an isolator duct that extends axially from an inlet side and a burner side, wherein the sensor values are strain data sensed by the plurality of strain sensors on the radially outward surface of the isolator duct;
    determining, by the processor, a measured strain distribution based on the sensor values and axial locations of the plurality of strain sensors;
    estimating, by the processor, a shock train leading edge position of a shock train based on identifying a shock train leading edge in the measured strain distribution, wherein the engine system comprises an air-breathing propulsion engine; and
    controlling, based on the estimated shock train leading edge position, at least one of a fuel injector to modulate fuel flow to the engine system and control back pressure produced by the engine system to at least prevent an unstart from occurring in the engine system and one or more bleed valves to at least one of divert low-momentum boundary layer air to prevent premature unstart or bypass air to reduce combustion backpressure or a combination thereof.

13. The method of claim 12, wherein the plurality of strain sensors comprise at least one of a foil strain gauge, a wire strain gauge, an optical fiber Bragg grating strain gauge, a ceramic strain gauge, or an optical interferometric hoop strain gauge.

14. The method of claim 12, further comprising generating, by the processor, an unstart onset alert when the shock train leading edge position is below a distance threshold from the inlet side.

15. The method of claim 12, wherein the shock train leading edge position is estimated by:
    performing, by the processor, an estimation of a strain distribution profile relative to the measured strain distribution; and
    determining, by the processor, the shock train leading edge position as an axial position on the estimation that meets an operational definition of the shock train leading edge position.

16. The method of claim 15, wherein a regression analysis is used in the performing the estimation of the strain distribution profile relative to the measured strain distribution, and wherein the axial position corresponds to a most upstream axial position on the estimation relative to other axial positions on the estimation.

17. The method of claim 12, wherein the determining of the measured strain distribution comprises:
    applying, by the processor, temperature compensation to determine one or more effects of thermal stress on isolator strain; and removing, by the processor, the one or more effects of the thermal stress from the sensor values.

18. The method of claim 17, wherein the applying of the temperature compensation comprises using one of a measured isolator temperature profile or a calculated isolator temperature profile.

19. The method of claim 12, further comprising estimating, by the processor, the shock train leading edge position based on converting the measured strain distribution to a calculated pressure distribution.

20. The method of claim 19, wherein the converting of the measured strain distribution to the calculated pressure distribution comprises determining, by the processor, pressure from an induced stress based on material and geometric dimensions of the isolator duct.

* * * * *